(12) United States Patent
Wu et al.

(10) Patent No.: US 9,233,496 B2
(45) Date of Patent: Jan. 12, 2016

(54) ADJUSTMENT MECHANISM OF MOLD SYSTEM HAVING ELECTRICALLY ADJUSTING AND POSITIONING FUNCTIONS

(75) Inventors: Cheng-Hsien Wu, Kaohsiung (TW); Cheng-Hao Chiu, Kaohsiung (TW); Chieh-Ju Wu, Taichung (TW); Kai-En Chang, Taichung (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 626 days.

(21) Appl. No.: 13/455,214

(22) Filed: Apr. 25, 2012

(65) Prior Publication Data
US 2012/0273983 A1  Nov. 1, 2012

(30) Foreign Application Priority Data
Apr. 27, 2011  (TW) .............................. 100114609 A

(51) Int. Cl.
*B28B 7/02* (2006.01)
*B29C 45/26* (2006.01)

(52) U.S. Cl.
CPC .................................. *B29C 45/2606* (2013.01)

(58) Field of Classification Search
CPC .. B29C 33/303; B29C 33/305; B29C 33/308; B29C 33/30; B29C 33/20; B29C 33/202; B29C 33/22; B29C 33/24; B29C 33/26; B29C 33/28; B29C 2033/207; B29C 45/2606; B29C 2049/4856

USPC ......... 425/138, 150, 171, 400, 468; 264/40.5, 264/39
See application file for complete search history.

(56) References Cited

U.S. PATENT DOCUMENTS

| | | | | |
|---|---|---|---|---|
| 4,676,649 A | * | 6/1987 | Phillips | 356/401 |
| 5,682,228 A | * | 10/1997 | Miyake | 355/75 |
| 6,469,773 B1 | * | 10/2002 | Iwamoto | 355/53 |
| 6,732,442 B2 | | 5/2004 | Wu et al. | |
| 7,114,941 B2 | | 10/2006 | Huang et al. | |
| 7,491,049 B2 | | 2/2009 | Yu | |
| 7,524,184 B2 | | 4/2009 | Hsu | |
| 7,625,513 B2 | | 12/2009 | Yu | |

FOREIGN PATENT DOCUMENTS

TW  M322721 U  11/2007
TW  I330567     9/2010

* cited by examiner

*Primary Examiner* — Timothy Kennedy
(74) *Attorney, Agent, or Firm* — Alan D. Kamrath; Kamrath IP Lawfirm, P.A.

(57) ABSTRACT

A mold system includes a carrier platform and an adjustment mechanism. The carrier platform is provided to arrange at least one mold member. The adjustment mechanism includes at least two adjustment units arranged on the carrier platform. Each of the adjustment units includes a positioning member and an electrically-driven adjustment member pivotally-connected therewith. In adjustment operation, the positioning members commonly engage with the mold member and are driven by the electrically-driven adjustment members.

19 Claims, 6 Drawing Sheets

ADJUSTMENT MECHANISM OF MOLD SYSTEM HAVING ELECTRICALLY ADJUSTING AND POSITIONING FUNCTIONS

BACKGROUND OF THE INVENTION

1. Field of the Invention

The present invention relates to a mold system having electrically adjusting and positioning functions. More particularly, the present invention relates to an adjustment mechanism of the mold system providing a fine adjustment of movement and rotation.

2. Description of the Related Art

For example, U.S. Pat. No. 6,732,442, entitled "Precise mechanism for load port adjustment," discloses an apparatus and method for adjusting the position of a load port utilized in a semiconductor wafer processing system. However, the mechanism fails to disclose electrical adjustment for adjusting positions.

Taiwanese Patent Pub. No. 1330567, entitled "Rotary and micro-adjustment mechanism for a double-drive and synchronous positioning platform," discloses a rotary and micro-adjustment mechanism for a double-drive and synchronous positioning platform (such as a gantry). However, the adjustment mechanism fails to disclose electrical adjustment for adjusting positions.

Taiwanese Patent Pub. No. M322721, entitled "Adjustment of an electrical slide mechanism," discloses an adjustment of an electrical slide mechanism for adjusting and positioning a carrier seat. However, there is a need of improving the adjustment of the electrical slide mechanism.

Taiwanese Patent Pub. No. 405522, entitled "Electrical adjustment of an upper mold of a vacuum molding mechanism," discloses an adjustment of an electrical mechanism for adjusting an upper mold by a motor. However, there is a need of improving the adjustment of the electrical mechanism.

Taiwanese Patent Pub. No. 1279306, entitled "Adjustment mechanism for adjusting relative positions of injection nozzles of an injection device," discloses an adjustment mechanism for adjusting relative positions of injection nozzles along X and Y axes. However, there is a need of improving the adjustment of the electrical mechanism.

U.S. Pat. No. 7,491,049, entitled "Apparatus for hot embossing lithography," discloses an apparatus for hot embossing lithography, including a press mold, a substrate, a first heating device, a second heating device, and a vacuum chamber. However, the apparatus fails to disclose how to precisely adjust fine positions of the press mold.

U.S. Pat. No. 7,625,513, entitled "Hot embossing lithography method," discloses a hot embossing lithography method, including the step of aligning a press mold with a polymer thin film. However, the method fails to disclose the step of precisely adjusting fine positions of the press mold.

U.S. Pat. No. 7,114,941, entitled "Hot embossing auto-leveling apparatus and method," discloses a hot embossing auto-leveling apparatus which has an air-floating spherical bearing between a lower mold and a base. In operation, the lower mold is adjusted against an upper mold by the air-floating spherical bearing. However, the apparatus fails to disclose how to precisely adjust fine positions of the upper and lower molds.

The above-mentioned patents are incorporated herein by reference for purposes including, but not limited to, indicating the background of the present invention and illustrating the state of the art.

As is described in greater detail below, the present invention provides an adjustment mechanism of a mold system having electrically adjusting and positioning functions. A plurality of electrically-driven adjustment units is operated to adjust fine movement and rotation of a mold member in such a way to mitigate and overcome the above problem.

SUMMARY OF THE INVENTION

The primary objective of this invention is to provide an adjustment mechanism of a mold system having electrically adjusting and positioning functions. At least two electrically-driven adjustment units are operated to adjust fine movement and rotation of a mold member. Accordingly, the mechanism is successful in precisely adjusting rectilinear or rotational movement of the mold member.

The adjustment mechanism of a mold system in accordance with an aspect of the present invention includes:

a carrier platform provided to arrange at least one mold member; and an adjustment mechanism arranged on the carrier platform, including;

at least two adjustment units arranged on the carrier platform, with each of the at least two adjustment units including a positioning member and an electrically-driven adjustment member pivot-connected therewith, and with the positioning members commonly with the mold member.

The mold system in accordance with a separate aspect of the present invention includes:

a carrier platform having a first position, a second position and a third position and provided to arrange at least one mold member;

a first adjustment unit arranged on the first position of the carrier platform, including a first positioning member and a first electrically-driven adjustment member pivotally-connected therewith;

a second adjustment unit arranged on the second position of the carrier platform, including a second positioning member and a second electrically-driven adjustment member pivotally-connected therewith; and a third adjustment unit arranged on the third position of the carrier platform, including a third positioning member and a third electrically-driven adjustment member pivot-connected therewith, with the first positioning member, the second positioning member and the third positioning member commonly engaged with the mold member.

In a separate aspect of the present invention, the positioning member includes a pivotal seat and a slide member.

In a further separate aspect of the present invention, the pivotal seat includes a retaining member.

In yet a further separate aspect of the present invention, the slide member includes a guiding track to combine with the retaining member.

In yet a further separate aspect of the present invention, the electrically-driven adjustment member includes a positioning seat, an adjustment screw and a drive component.

In yet a further separate aspect of the present invention, the positioning seat screw-connects with the adjustment screw.

In yet a further separate aspect of the present invention, the positioning seat includes a pivotal axis.

In yet a further separate aspect of the present invention, the drive component is operated to rotate the adjustment screw.

In yet a further separate aspect of the present invention, movements of the second adjustment unit, the second adjustment unit and the third adjustment unit are different to generate a rotational angle of the mold member.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that an adjustment mechanism of the mold system in accordance with the preferred embodiments of the present invention is suitable for various mold devices or injection molding machines, which are not limitative of the present invention. The adjustment mechanism is applicable for a horizontal (vertical or tilt) adjustment mechanism with respect to a mold system, which is not limitative of the present invention.

Figure 1:
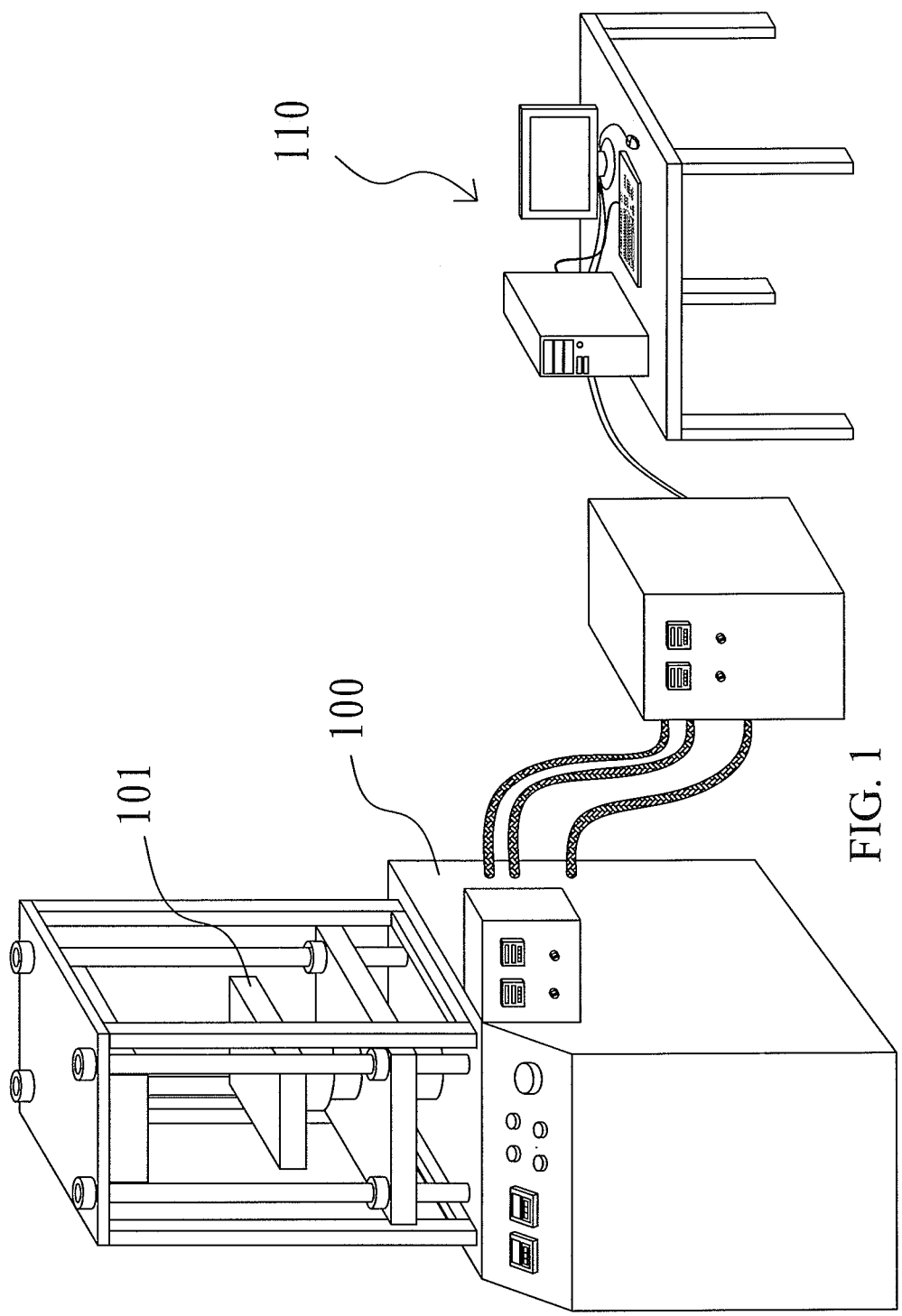
FIG. 1 is a schematic view of a mold system having electrically adjusting and positioning functions combined with a monitoring system in accordance with a preferred embodiment of the present invention.

FIG. 1 shows a schematic view of a mold system having electrically adjusting and positioning functions combined with a monitoring system in accordance with a preferred embodiment of the present invention. Referring to FIG. 1, the mold system includes a molding machine 100 and a monitoring system 110 electrically connected thereto, so that the monitoring system 110 is capable of setting and controlling the molding machine 100. By way of example, the monitoring system 110 includes a computer device and a monitor in fluid connection with a mechanical apparatus of the molding machine 100.

Figure 2:
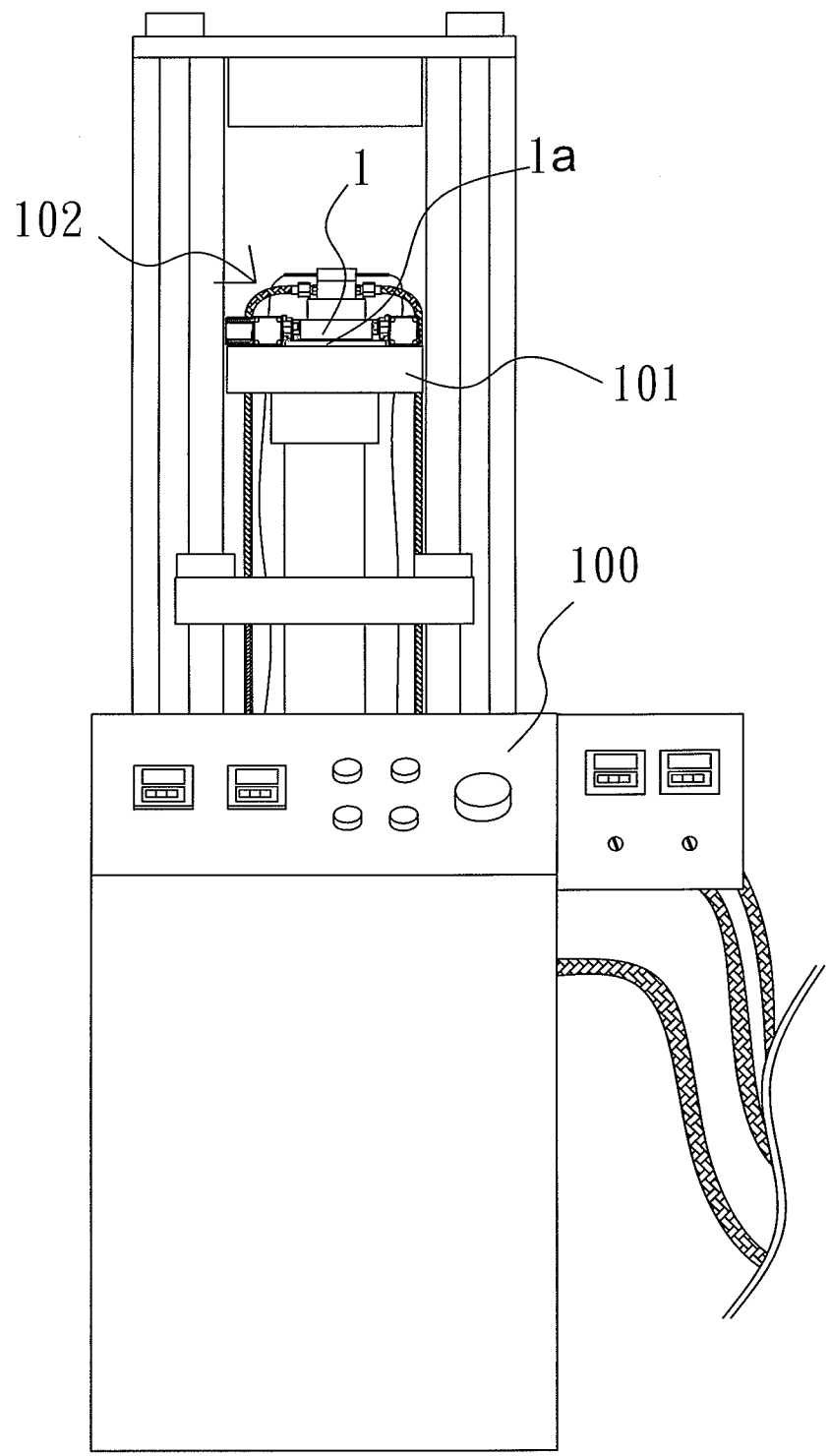
FIG. 2 is a schematic front view of the mold system in accordance with the preferred embodiment of the present invention.

FIG. 2 shows a schematic front view of the mold system in accordance with the preferred embodiment of the present invention, depicted in FIG. 1. Referring now to FIGS. 1 and 2, the molding machine 100 includes a table plate 101 on which to mount an adjustment mechanism 102. The adjustment mechanism 102 is operated to adjust positions and rotations of a mold member 1 on the table plate 101.

Figure 2A:
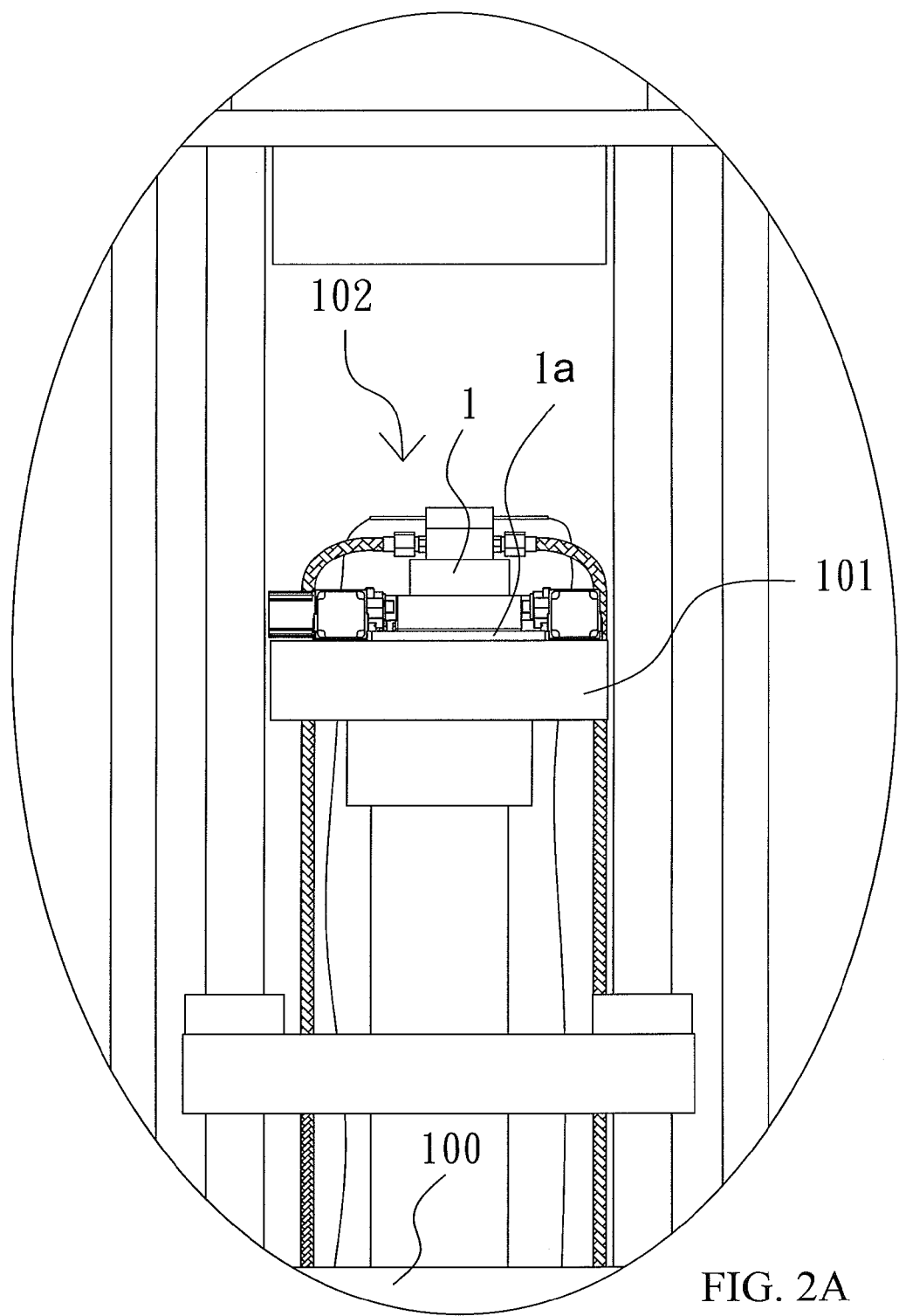
FIG. 2A is an enlarged view, in FIG. 2, of the mold system in accordance with the preferred embodiment of the present invention.

Turning now to FIG. 2A, an enlarged view of the mold system in accordance with the preferred embodiment of the present invention is shown and corresponds to that shown in FIG. 2. Referring to FIGS. 2 and 2A, the molding machine 100 electrically connects with the adjustment mechanism 102. Furthermore, the molding machine 100 is in electrical and fluid (i.e. heating pipeline) connection with the mold member 1. By way of example, the mold member 1 includes an upper mold, an intermediate mold, a lower mold and at least one mold core member which are connected with a heater or other known mechanical devices.

Figure 3:
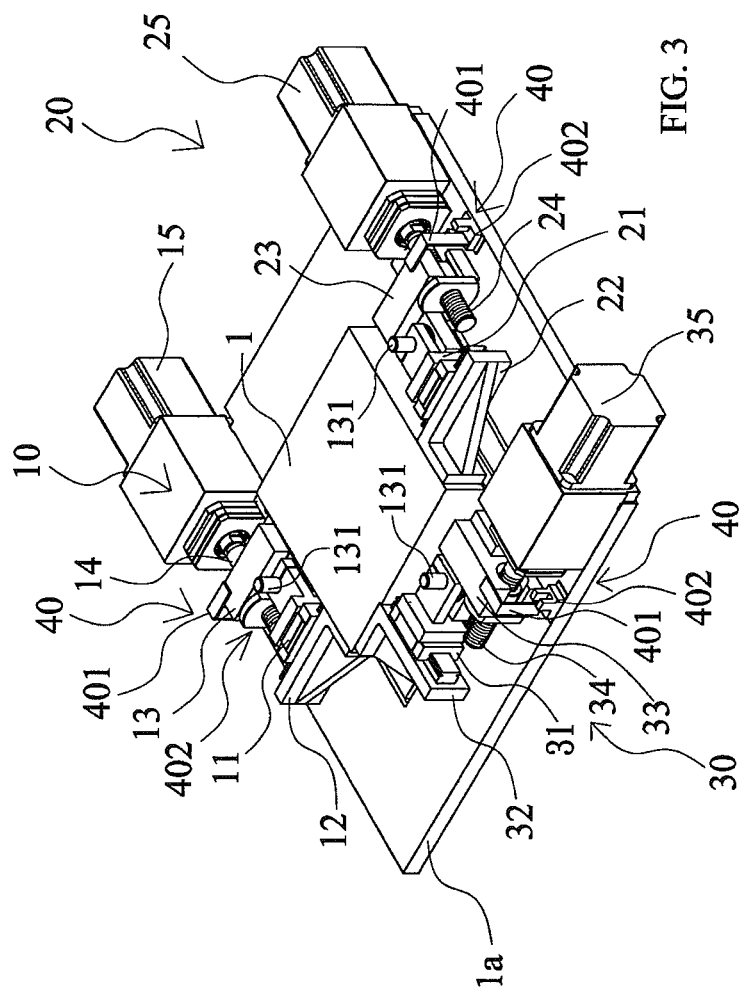
FIG. 3 is a perspective view of an adjustment mechanism applied in the mold system in accordance with the preferred embodiment of the present invention.

FIG. 3 shows a perspective view of an adjustment mechanism applied in the mold system in accordance with the preferred embodiment of the present invention, depicted in FIGS. 2 and 2A. Referring to FIG. 3, the adjustment mechanism 102 includes a carrier platform 1a, a first adjustment unit 10, a second adjustment unit 20 and a third adjustment unit 30. The first adjustment unit 10, the second adjustment unit 20 and the third adjustment unit 30 are provided on the carrier platform 1a for adjusting the mold member 1 located on a center position of the carrier platform 1a.

With continued reference to FIG. 3, the carrier platform 1a has a first (predetermined) position, a second (predetermined) position and a third (predetermined) position. Provided among the first, second and third positions is an operational space to accommodate the mold member 1. In the operational space, at least one of the first adjustment unit 10, the second adjustment unit 20 and the third adjustment unit 30 is controllably operated to move or rotate the mold member 1.

Still referring to FIG. 3, the first adjustment unit 10 is mounted on the first position of the carrier platform 1a and corresponds to the second adjustment unit 20 and the third adjustment unit 30. The first adjustment unit 10 includes a first positioning member and a first electrically-driven adjustment member pivotally-connected therewith, so that the first positioning member is operated to rotate a predetermined angle with respect to the first electrically-driven adjustment member. The first electrically-driven adjustment member includes an auxiliary adjustment member 40, further including a reciprocating guide member 401 mounted on the electrically-driven adjustment member and a guiding groove member 402 mounted on the carrier platform 1a to receive the reciprocating guide member 401 therein in adjusting operation. The reciprocating guide member 401 is a L-shaped member, and the guiding groove member 402 is a recession groove member.

Still referring to FIG. 3, the first positioning member includes a pivotal seat 11 and a slide member 12. In operation, the pivotal seat 11 allows rotational movements of the first positioning member, and the slide member 12 allows rectilinear movements of the first positioning member. In the preferred embodiment, the pivotal seat 11 includes a retaining member (e.g., C-shaped retaining member 111), and the slide member 12 includes a guiding track 121 to combine with the retaining member by catching the guiding track 121 with the C-shaped retaining member 111.

Still referring to FIG. 3, the first electrically-driven adjustment member includes a positioning seat 13, an adjustment screw 14 and a drive component 15. In the preferred embodiment, the positioning seat 13 includes a pivotal axis (e.g. vertical pivotal axis 131) to pivotally connect with the pivotal seat 11 of the first positioning member by the vertical pivotal axis 131 vertically extending upward to pivotally connect with a hole 112 of the pivotal seat. Furthermore, the positioning seat 13 is in screw connection with the adjustment screw 14 which extends through a screw hole of the positioning seat 13. When the drive component 15 is operated to rotate the adjustment screw 14, the adjustment screw 14 is driven to move the positioning seat 13 which then drives the first positioning member to travel along. The drive component 15 is controllably operated to rotate the adjustment screw 14 in clockwise or anti-clockwise direction, so that the first positioning member is controlled to move forward or backward.

Still referring to FIG. 3, the second adjustment unit 20 is mounted on the second position of the carrier platform 1a and corresponds to the first adjustment unit 10 and the third adjustment unit 30. The second adjustment unit 20 includes a second positioning member and a second electrically-driven adjustment member pivot-connected therewith, so that the second positioning member is operated to rotate a predetermined angle with respect to the second electrically-driven adjustment member. The second electrically-driven adjustment member includes an auxiliary adjustment member 40, further including a reciprocating guide member 401 mounted on the electrically-driven adjustment member and a guiding groove member 402 mounted on the carrier platform 1a to receive the reciprocating guide member 401 therein in adjusting operation. The reciprocating guide member 401 is a L-shaped member, and the guiding groove member 402 is a recession groove member.

Still referring to FIG. 3, the second positioning member includes a pivotal seat 21 and a slide member 22. In operation, the pivotal seat 21 allows rotational movements of the second positioning member, and the slide member 22 allows rectilinear movements of the second positioning member. In the preferred embodiment, the pivotal seat 21 includes a retaining member (e.g., C-shaped retaining member 111), and the slide member 22 includes a guiding track 121 to combine with the retaining member by catching the guiding track 121 with the C-shaped retaining member 111.

Still referring to FIG. 3, the second electrically-driven adjustment member includes a positioning seat 23, an adjustment screw 24 and a drive component 25. In the preferred embodiment, the positioning seat 23 includes a pivotal axis (e.g. vertical pivotal axis 131) to pivotally connect with the pivotal seat 21 of the second positioning member by the vertical pivotal axis 131 vertically extending upward to pivotally connect with a hole 112 of the pivotal seat. Furthermore, the positioning seat 23 is in screw connection with the adjustment screw 24 which extends through a screw hole of the positioning seat 23. When the drive component 25 is operated to rotate the adjustment screw 24, the adjustment screw 24 is driven to move the positioning seat 23 which then drives the second positioning member to travel along. The drive component 25 is controllably operated to rotate the adjustment screw 24 in clockwise or anti-clockwise direction, so that the second positioning member is controlled to move forward or backward.

Still referring to FIG. 3, the third adjustment unit 30 is mounted on the third position of the carrier platform 1a and corresponds to the first adjustment unit 10 and the second adjustment unit 20. The third adjustment unit 30 includes a third positioning member and a third electrically-driven adjustment member pivotally-connected therewith, so that the third positioning member is operated to rotate a predetermined angle with respect to the third electrically-driven adjustment member. The third electrically-driven adjustment member includes an auxiliary adjustment member 40, further including a reciprocating guide member 401 mounted on the electrically-driven adjustment member and a guiding groove member 402 mounted on the carrier platform 1a to receive the reciprocating guide member 401 therein in adjusting operation. The reciprocating guide member 401 is a L-shaped member, and the guiding groove member 402 is a recession groove member.

Still referring to FIG. 3, the third positioning member includes a pivotal seat 31 and a slide member 32. In operation, the pivotal seat 31 allows rotational movements of the third positioning member, and the slide member 32 allows rectilinear movements of the third positioning member. In the preferred embodiment, the pivotal seat 31 includes a retaining member (e.g., C-shaped retaining member 111), and the slide member 32 includes a guiding track 121 to combine with the retaining member by catching the guiding track 121 with the C-shaped retaining member 111.

Still referring to FIG. 3, the third electrically-driven adjustment member includes a positioning seat 33, an adjustment screw 34 and a drive component 35. In the preferred embodiment, the positioning seat 33 includes a pivotal axis (e.g. vertical pivotal axis 131) to pivotally connect with the pivotal seat 31 of the third positioning member by the vertical pivotal axis 131 vertically extending upward to pivotally connect with a hole 112 of the pivotal seat. Furthermore, the positioning seat 33 is in screw connection with the adjustment screw 34 which extends through a screw hole of the positioning seat 33. When the drive component 35 is operated to rotate the adjustment screw 34, the adjustment screw 34 is driven to move the positioning seat 33 which then drives the third positioning member to travel along. The drive component 35 is controllably operated to rotate the adjustment screw 34 in clockwise or anti-clockwise direction, so that the third positioning member is controlled to move forward or backward.

Figure 4:
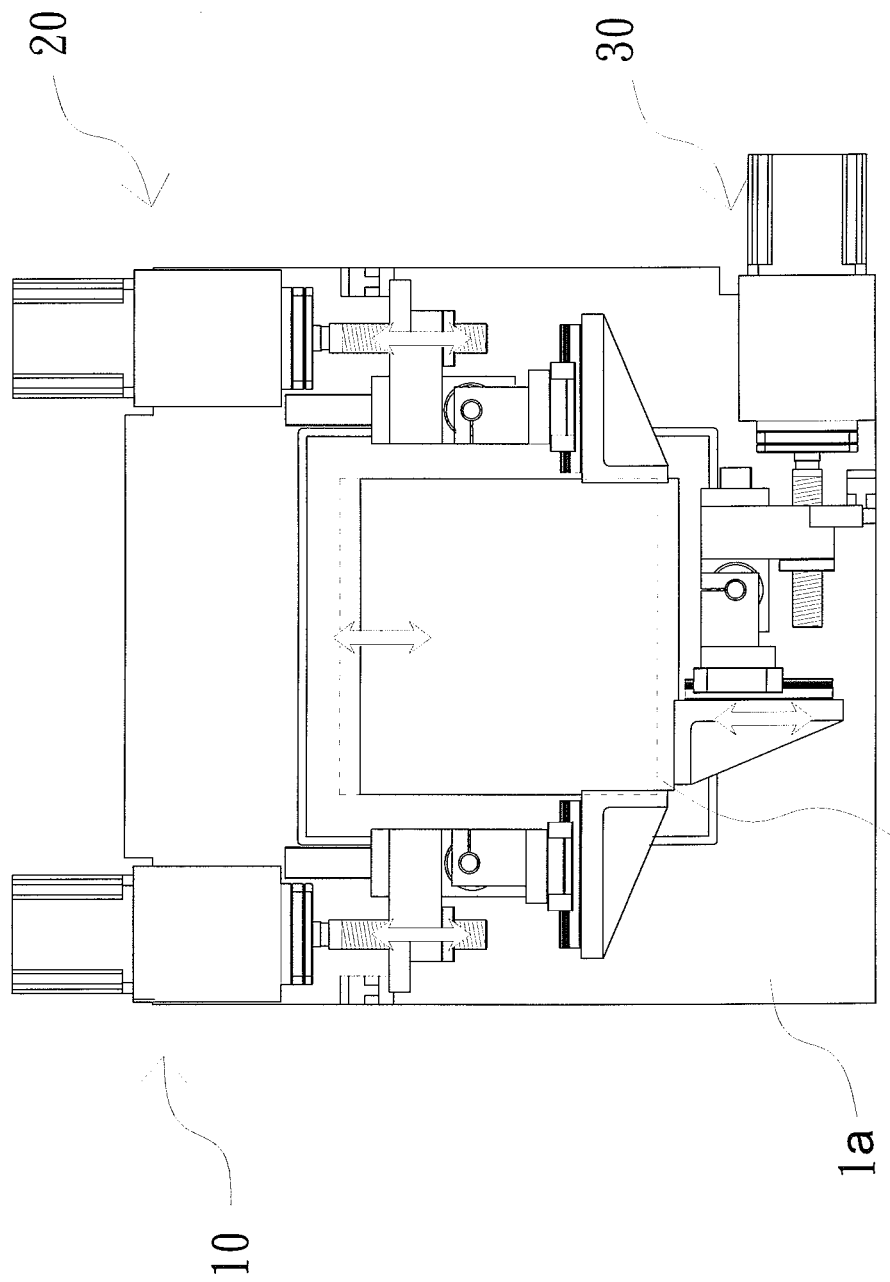
FIG. 4 is a schematic top view of operating the adjustment mechanism to move a predetermined distance in accordance with the preferred embodiment of the present invention.

FIG. 4 shows a schematic top view of operating the adjustment mechanism to move a predetermined distance in accordance with the preferred embodiment of the present invention. Referring to FIG. 4, in fine adjustment operation, the first adjustment unit 10 and the second adjustment unit 20 are a clamp to engage with two opposite sides of the mold member 1, so that the pivotal seat 11 and the pivotal seat 21 are capable of traveling along the adjustment screw 14 and the adjustment screw 24 forward or backward, respectively. The third adjustment unit 30 is engaged with one of two other sides of the mold member 1, so that the pivotal seat 31 is capable of traveling along the adjustment screw 34 forward or backward.

Referring back to FIGS. 3 and 4, when the drive component 15 of the first adjustment unit 10 and the drive component 25 of the second adjustment unit 20 are synchronously operated, the slide member 12 and the positioning seat 13 are moved along the adjustment screw 14 a rectilinear distance, as best shown in the left-side arrow in FIG. 4, and the slide member 22 and the positioning seat 23 are moved along the adjustment screw 24 the same rectilinear distance, as best shown in the right-side arrow in FIG. 4. Meanwhile, the drive component 35 of the third adjustment unit 30 is stopped, and the guiding track of the slide member 32 retained in the retaining member of the pivotal seat 31 is only allowed to move the same rectilinear distance and direction, as best shown in the bottom-side arrow in FIG. 4. Consequently, the mold member 1 is adjusted in the same rectilinear distance and direction, as best shown in the arrow direction in FIG. 4.

Figure 5:
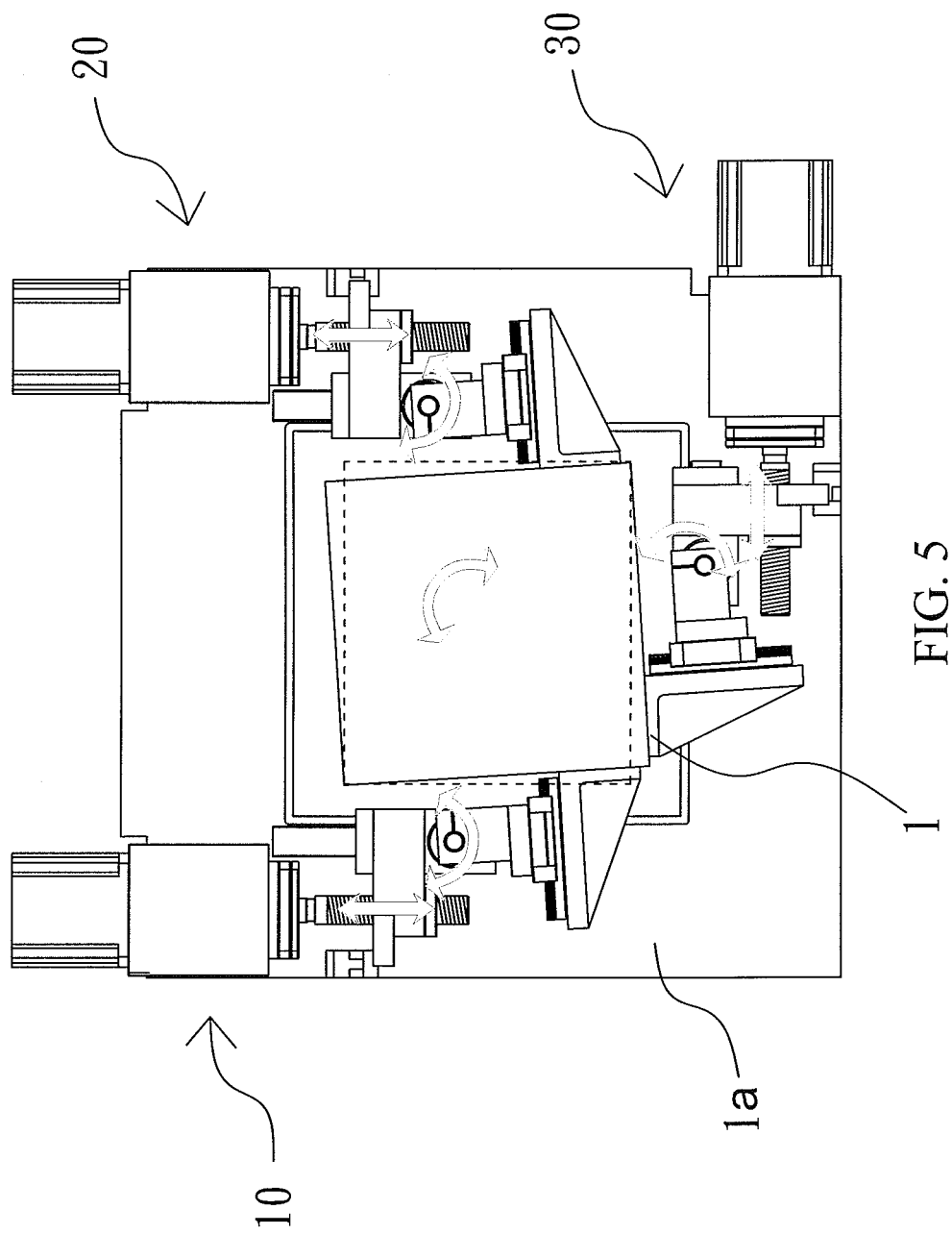
FIG. 5 is a schematic top view of operating the adjustment mechanism to rotate a predetermined angle in accordance with the preferred embodiment of the present invention.

FIG. 5 shows a schematic top view of operating the adjustment mechanism to rotate a predetermined angle in accordance with the preferred embodiment of the present invention. Referring to FIG. 5, the first adjustment unit 10, the second adjustment unit 20 and the third adjustment unit 30 can generate different movements to relatively rotate the mold member 1. In rotational adjustment operation, the first adjustment unit 10, the second adjustment unit 20 and the third adjustment unit 30 are controlled to rotate the mold member 1 in a clockwise or anti-clockwise direction.

For example, when the drive component 15 of the first adjustment unit 10 and the drive component 25 of the second adjustment unit 20 are operated in different movements, the pivotal seats 11, 21, 31 of the adjustment units 10, 20, 30 rotate synchronously, as best shown in the arrows in FIG. 5. Consequently, the mold member 1 is adjusted to rotate in a clockwise or anti-clockwise direction.

Although the invention has been described in detail with reference to its presently preferred embodiment(s), it will be understood by one of ordinary skill in the art that various modifications can be made without departing from the spirit and the scope of the invention, as set forth in the appended claims.

What is claimed is:

1. An adjustment mechanism comprising:
a carrier platform provided to arrange at least one mold member; and
an adjustment mechanism arranged on the carrier platform, including a plurality of adjustment units arranged on the carrier platform, with each of the adjustment units including a slide member, a positioning member and an electrically-driven adjustment member pivotally-connected with the positioning member, with the electrically-driven adjustment member including an auxiliary adjustment member, and with the auxiliary adjustment member further including a reciprocating guide member mounted on the electrically-driven adjustment member and a guiding groove member mounted on the carrier platform to receive the reciprocating guide member therein in adjusting operation;
wherein the positioning member is moveable by the electrically-driven adjustment member in an adjustment direction parallel to the carrier platform, wherein the slide member is pivotal relative to the positioning member about an axis perpendicular to the carrier platform and the adjustment direction and moveable in a slide direction parallel to the carrier platform, perpendicular to the axis, and at a non-parallel angle to the adjustment direction, with the slide member abutting with the at least one mold member, and
wherein the positioning members commonly engage with the mold member.

2. The adjustment mechanism as defined in claim 1, wherein the positioning member further includes a pivotal seat.

3. The adjustment mechanism as defined in claim 2, wherein the pivotal seat includes a retaining member formed with a C-shaped retaining member.

4. The adjustment mechanism as defined in claim 3, wherein the slide member includes a guiding track to combine with the retaining member, with the C-shaped retaining member catching the guiding track of the slide member.

5. The adjustment mechanism as defined in claim 1, wherein the electrically-driven adjustment member includes a positioning seat provided to mount the reciprocating guide member, an adjustment screw and a drive component.

6. The adjustment mechanism as defined in claim 5, wherein the positioning seat screw-connects with the adjustment screw.

7. The adjustment mechanism as defined in claim 5, wherein the positioning seat includes a vertical pivotal axis to pivotally connect with a pivotal seat of the positioning member, and wherein the vertical pivotal axis vertically extends upward to pivotally connect with a hole of the pivotal seat.

8. The adjustment mechanism as defined in claim 5, wherein the drive component is operated to rotate the adjustment screw.

9. The adjustment mechanism as defined in claim 1, wherein the reciprocating guide member is a L-shaped member mounted on the electrically-driven adjustment member, and wherein the guiding groove member is a recession groove member extending along the adjustment direction and mounted on the carrier platform to receive the L-shaped member therein in adjusting operation.

10. An adjustment mechanism comprising:
a carrier platform having a first position, a second position and a third position and provided to arrange at least one mold member;
a first adjustment unit arranged on the first position of the carrier platform, including a first slide member, a first positioning member and a first electrically-driven adjustment member pivotally-connected with the first positioning member, with the first positioning member moveable by the first electrically-driven adjustment member in a first adjustment direction parallel to the carrier platform, with the first slide member pivotal relative to the first positioning member about a first axis perpendicular to the carrier platform and the first adjustment direction and moveable in a first slide direction parallel to the carrier platform, perpendicular to the first axis, and at a first non-parallel angle to the first adjustment direction, with the first slide member abutting with the at least one mold member;
a second adjustment unit arranged on the second position of the carrier platform, including a second slide member, a second positioning member and a second electrically-driven adjustment member pivotally-connected with the second positioning member, with the second positioning member moveable by the second electrically-driven adjustment member in a second adjustment direction parallel to the carrier platform with the second slide member pivotal relative to the second positioning member about a second axis perpendicular to the carrier platform and the second adjustment direction and moveable in a second slide direction parallel to the carrier platform, perpendicular to the second axis, and at a second non-parallel angle to the second adjustment direction, with the second slide member abutting with the at least one mold member; and
a third adjustment unit arranged on the third position of the carrier platform, including a third slide member, a third positioning member and a third electrically-driven adjustment member pivotally-connected with the third positioning member, with the third positioning member moveable by the third electrically-driven adjustment member in a third adjustment direction parallel to the carrier platform, with the third slide member pivotal relative to the third positioning member about a third axis perpendicular to the carrier platform and the third adjustment direction and moveable in a third slide direction parallel to the carrier platform, perpendicular to the third axis, and at a third non-parallel angle to the third adjustment direction, with the third slide member abutting with the at least one mold member;
wherein one of the first electrically-driven adjustment member, the second electrically-driven adjustment member and third electrically-driven adjustment member includes an auxiliary adjustment member which further includes a reciprocating guide member mounted on one of the first electrically-driven adjustment member, the second electrically-driven adjustment member and third electrically-driven adjustment member and a guiding groove member mounted on the carrier platform to receive the reciprocating guide member therein in adjusting operation; and
wherein the first positioning member, the second positioning member and the third positioning member commonly engage with the mold member.

11. The adjustment mechanism as defined in claim 10, wherein the first positioning member further includes a pivotal seat.

12. The adjustment mechanism as defined in claim 11, wherein the pivotal seat includes a retaining member formed with a C-shaped retaining member.

13. The adjustment mechanism as defined in claim 12, wherein the first slide member includes a guiding track to combine with the retaining member, with the C-shaped retaining member catching the guiding track of the first slide member.

14. The adjustment mechanism as defined in claim 11, wherein one of the first electrically-driven adjustment member, the second electrically-driven adjustment member and third electrically-driven adjustment member includes a positioning seat provided to mount the reciprocating guide member, an adjustment screw and a drive component.

15. The adjustment mechanism as defined in claim 14, wherein the positioning seat screw-connects with the adjustment screw.

16. The adjustment mechanism as defined in claim 14, wherein the positioning seat includes a vertical pivotal axis to pivotally connect with a pivotal seat of the positioning member, and wherein the vertical pivotal axis vertically extends upward to pivotally connect with a hole of the pivotal seat.

17. The adjustment mechanism as defined in claim 14, wherein the reciprocating guide member is a L-shaped member mounted on the one of the first electrically-driven adjustment member, the second electrically-driven adjustment member and third electrically-driven adjustment member, and wherein the guiding groove member is a recession groove member mounted on the carrier platform to receive the L-shaped member therein in adjusting operation.

18. The adjustment mechanism as defined in claim 10, wherein movements of the first adjustment unit, the second adjustment unit and the third adjustment unit are different to generate a rotational angle of the mold member.

19. A control method for an adjustment mechanism comprising:
    providing a plurality of adjustment units to engage with a mold member;
    each of the adjustment units including a slide member, a positioning member and an electrically-driven adjustment member pivotally-connected with the positioning member, wherein the positioning member is moveable by the electrically-driven adjustment member in an adjustment direction parallel to the carrier platform, wherein the slide member is pivotal relative to the positioning member about an axis perpendicular to the carrier platform and the adjustment direction and moveable in a slide direction parallel to the carrier platform, perpendicular to the axis, and at a non-parallel angle to the adjustment direction with the slide member abutting with the at least one mold member and with the electrically-driven adjustment member including an auxiliary adjustment member, and with the auxiliary adjustment member further including a reciprocating guide member mounted on the electrically-driven adjustment member and a guiding groove member mounted on the carrier platform to receive the reciprocating guide member therein in adjusting operation; and
    operating the at least one electrically-driven adjustment member to generate a movement of the positioning member;
    wherein the movements of the positioning member are controlled to generate a rectilinear or rotational movement of the mold member.

\* \* \* \* \*